(12) United States Patent
Thompson

(10) Patent No.: US 6,631,777 B1
(45) Date of Patent: Oct. 14, 2003

(54) TRANSPORT VEHICLE FOR SKATERS AND SKIERS

(76) Inventor: Allister Wade Thompson, 704-1020 Harwood St., Vancouver, BC (CA), V6E 4R1

( * ) Notice: Subject to any disclaimer, the term of this patent is extended or adjusted under 35 U.S.C. 154(b) by 0 days.

(21) Appl. No.: 10/171,877

(22) Filed: Jun. 17, 2002

(51) Int. Cl.[7] .............................................. B62M 27/02
(52) U.S. Cl. ...................... 180/180; 180/181; 180/19.1; 280/784
(58) Field of Search ............................... 180/11, 13, 15, 180/16, 19.1, 19.3, 180, 181, 186; 280/1.5, 784

(56) References Cited

U.S. PATENT DOCUMENTS

| | | | |
|---|---|---|---|
| 3,797,446 A | | 3/1974 | Cox et al. |
| 3,826,323 A | * | 7/1974 | Mehne ........................ 180/180 |
| 4,456,089 A | * | 6/1984 | Kuwahara ................... 180/180 |
| 4,664,395 A | * | 5/1987 | McCoy ........................ 280/1.5 |
| 4,684,151 A | * | 8/1987 | Drewek ....................... 280/784 |
| 5,385,355 A | * | 1/1995 | Hoffman ...................... 280/1.5 |
| D372,000 S | * | 7/1996 | Searles .......................... D12/1 |
| 5,562,176 A | * | 10/1996 | Lucernoni et al. .......... 180/180 |
| 5,769,431 A | * | 6/1998 | Cordova ...................... 280/1.5 |
| 6,193,003 B1 | * | 2/2001 | Dempster ................... 180/180 |
| 6,467,559 B1 | * | 10/2002 | Farrell et al. ............... 180/180 |
| 2002/0125710 A1 | * | 9/2002 | Akiyama et al. ........... 280/784 |

FOREIGN PATENT DOCUMENTS

| | | |
|---|---|---|
| CA | 918199 | 1/1973 |
| DE | 0591718 * | 9/1993 |
| JP | 55-13666 * | 10/1980 |
| JP | 1-269682 * | 10/1989 |

* cited by examiner

*Primary Examiner*—Anne Marie Boehler

(57) ABSTRACT

A vehicle designed specifically to pull persons standing upright on roller skates, ice skates, skis etc. The invention can be configured to operate on any surface and comprises of an engine driving a wheel or track, connected through a frame to a body pad complete with shoulder and arm supports. The body pad can pivot independently of the frame. Handgrip controls contain actuators for acceleration and braking. The purpose of the invention being to produce a vehicle that allows the operator to be in complete control and to be able to make abrupt turns, accelerate or decelerate, all in an efficient manner. The operator of the vehicle remains in close contact with the vehicle by means of a torso clamp or belt securing the operator to a body pad. The torso clamp or belt can be adjusted to automatically release and disengage the operator in the event of a fall. Direction changes are accomplished by pulling against one of the handgrips, which has the effect of causing the body pad to pivot on its axis, effecting a change in the direction of travel. More pronounced turns require a combination of pivoting the body pad while shifting body weight and leaning in the desired direction of travel. Other versions of the vehicle have a complete crash guard around the operator and a wheel or ski joined directly of the body pad allowing its use without the need to wear skates, skis, etc.

10 Claims, 18 Drawing Sheets

TRANSPORT VEHICLE FOR SKATERS AND SKIERS

BACKGROUND OF THE INVENTION

This invention is intended to tow or pull persons standing upright on roller skates, skateboards, ice skates, skis or any other contrivance of the like. The purpose of the invention being to produce a vehicle that allows the operator to be in complete control of the vehicle while making abrupt turns, accelerating and decelerating. This invention seeks to overcome the problems associated with being pulled behind a motorized vehicle and has significant advantages over prior designs in operator comfort and practicality of operation. The invention can be configured to operate on any surface and comprises of an engine or motor, driving at least one wheel or a continuous track, connected through a frame to the operator's controls. The major contributions that the invention makes to the art of constructing such vehicles is in the relationship between the operator and the vehicle. This contribution is primarily in the way the operator is conveyed behind the machine, how the motive forces are transmitted from the vehicle to the operator, and how the operator guides the vehicle. The invention allows the vehicle to transfer the forces of acceleration and deceleration to the operator more efficiently while enhancing the degree of operator control.

PRIOR ART

Other inventions for a motorized vehicle intended to pull or tow a person, on snow skis, water skis or roller skates etc. follow the basic design that relies upon the strength of the operator's arms and hands to continuously grip the tow vehicle during its use, with the operator holding on to some sort of crossbar or handgrips. These prior designs have all of the forces of acceleration or deceleration from the vehicle transferred directly to the operator through the arms of the operator. The prior designs of such vehicles are impractical as the operator does not have good control of the vehicle and the forces transmitted to the operator promote operator fatigue. During rapid acceleration, the operators of such machines often do not posses the strength to hang on to the machine or to keep their feet braced beneath them. The same holds true during deceleration when braking, or making abrupt turns. In the event that the vehicle encounters an obstruction and or rapid deceleration, the operator is allowed to move unrestrained towards and against the vehicle, likely resulting in serious injuries.

Bolvin and Carr, Canadian patent 918,199 depict a machine for pulling people on skis. The motive force is directly applied to the operator's arms. There is no means to restrain the operator from moving forward against the machine, if the machine were to encounter an obstacle or if the machine was subjected to hard braking.

Cox et al, U.S. Pat. No. 3,797,446 reveals a machine intended to push people, the motive force being behind the operator, while still relying on the strength of the operator's arms. Cox et al attempts to alleviate the problem of the machine running over the operator, with the use of a harness connected to the brake mechanism. Any movement rearwards, intentionally or unintentionally will trigger the brake. There is very little to protect the operator should the vehicle collide with an obstacle.

The machines depicted by Cox et al and Bolvin/Carr are typical examples of prior art in this field, although neither have the features of the invention disclosed herein.

BRIEF SUMMARY OF THE INVENTION

This invention is an improvement over the existing designs for vehicles intended to tow or pull people on skates, skis etc. The invention incorporates the basics of a motor or engine to provide a forward motion through a traction means, i.e. rotating drive wheel or revolving track, connected to a frame. The frame can take the shape of a latticework or other rigid structural design. The frame of the vehicle is designed to absorb energy, in the event of the vehicle striking an object, and incorporates energy absorbing springs or energy absorbing crumple zones in the framework to absorb and lessen the impact. The frame has a folding stand attached which will contact the ground and hold the vehicle upright when the vehicle is parked and not in use by the operator. The folding stand is swung up and against the frame when the vehicle is in use. The folding stand has a spring assist to help hold it against the frame. The frame is connected to an ergonomically shaped and contoured pivoting body pad at a pivot point. The ability of the pivoting body pad to pivot around its axis allows for minor changes in direction to be quickly accomplished as well as reducing the amount of effort required by the operator. More drastic changes in the direction of travel are accomplished by the operator shifting his/her weight and leaning into the direction of travel, this in addition to allowing the pivoting body pad to pivot on its axis, effects a drastic change in the direction of the travel.

The pivoting body pad encompasses shoulder supports and a torso clamp. The operator is held against the pivoting body pad by the torso clamp, which is padded for comfort. Forces of acceleration are transferred to the operator through the torso clamp. The torso clamp assures that the operator remains in close contact with the vehicle so that the operator's body movements are communicated to the vehicle via the pivoting body pad. The pivoting body pad also absorbs and spreads out the forces of deceleration. The height of the pivoting body pad can be adjusted to suit different operators. The torso clamp is spring-loaded with the springs acting to force the clamp to close around the operator's body. If sufficient strain is placed against the springs, in the event of an accident, fall or undue overstress, the torso clamp will open to release the operator. The amount of spring loading is adjustable to allow for different levels of operator proficiency or the severity of terrain. A flexible waist belt with a quick release fastening system could be used in lieu of the torso clamp. This torso belt would encompass the operator and pivoting body pad and function in the same way as the torso clamp insomuch as a means to maintain the operator in close communication with the pivoting body pad. The torso belt would be fitted with a mechanism that would release at an adjustable level of tension to free the operator from the pivoting body pad.

Some vehicle weight is intended to rest on the shoulders of the operator. This weight is transmitted to the operator's shoulders through the shoulder supports that rest directly on the operator's shoulders. The shoulder supports are padded for comfort and are adjustable in the vertical axis to accommodate the different heights of operators. The shoulder supports also act as a means of transferring some of the forces of acceleration to the uppermost portion of the operator's body. Handgrips with controls are attached to the frame forward of the pivoting body pad and are gripped by the operator. The handgrip controls contain the necessary throttle and brake actuators and the position of the handgrips is fully adjustable to suit the different lengths of the operator's arms. The handgrips also have a crash guard extended on the outboard side to deflect objects that might accidentally strike the vehicle and the operator's hands.

It may also be desirable to fit the vehicle with a crash guard, which encompasses the peripheral area of the operator. A crash guard such as this is envisioned for those operators who would use the vehicle more aggressively or in competition with others. Versions of the vehicle equipped with an all encompassing crash guard system would be fitted with torso clamps or torso belts which may not have the automatic release feature, depending upon the operator's preference. Operators of such vehicles may chose that the torso clamp or torso belt be fitted with manual release types of closures only.

For further operator comfort, the weight of the operator's arms is supported by arm supports mounted on the frame of the vehicle. The arm supports are padded for comfort and their purpose is to further reduce the fatigue to the operator's arms. The height of the arm supports is adjustable in the vertical axis to accommodate different operators. The major contributions that the invention makes to the art of constructing such vehicles is in the relationship between the operator and the vehicle. This contribution is primarily in the way the operator is conveyed behind the machine, how the motive forces are transmitted from the vehicle to the operator, and how the operator guides the vehicle. The invention allows the vehicle to transfer the forces of acceleration to the operator through the torso clamp or torso belt, thus virtually eliminating any fatigue on the operator's arms. The shoulder supports transfer any weight from the vehicle, that is the weight which is not supported by the drive wheel, to the operator's shoulders. The shoulder supports also act as a means of transferring some of the forces of acceleration to the uppermost portion of the operator's body. Another major contribution that the invention makes is in the event that the operator of the vehicle meets with an obstruction that causes rapid deceleration, the pivoting body pad helps to transfer the forces more evenly to the operator's body, while the compression springs and crumple zones built into the frame, which might be substituted for any known technological equivalent, also absorb impact.

The vehicle is envisioned for recreational purposes with the operator wearing roller skates, skis, etc. It is possible that some people may not wish to wear skates or skis and may choose a modification of the machine that attaches at least one ski or wheel to the lower portion of the pivoting body pad assembly. In this configuration, the operator would stand on a platform with the wheel mounted below, or stand directly on the ski. The operation of the vehicle would be similar to the previously mentioned version with the operator pivoting the body pad and platform together to change direction. In this configuration, the wheels or skis support any of the weight not supported by the drive train and the shoulder supports can be removed, at the operator's discretion.

DRAWINGS

The following descriptions with reference to the drawings is given as non-limiting examples and will enable the method of carrying the invention into effect to be better understood.

Figure 8:
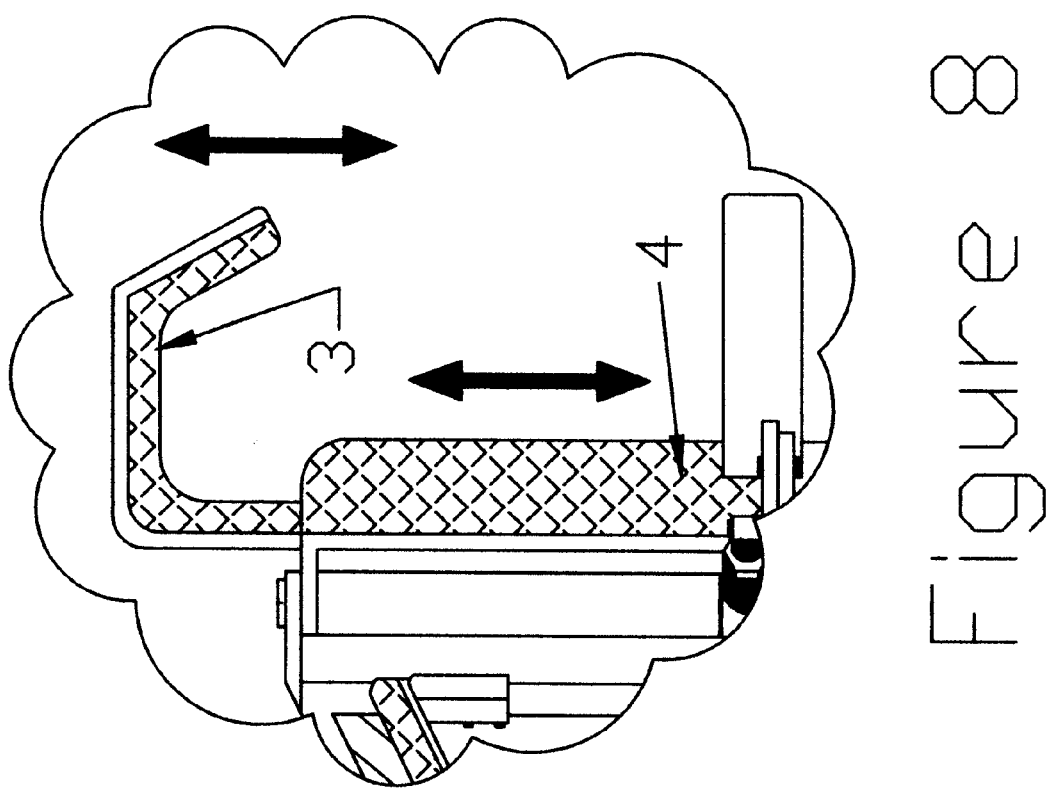

FIG. 8 is an enlarged view of the pivoting body pad and shoulder supports. The arrows depict the direction of adjustment of the pivoting body pad and shoulder supports. The pivoting body pad and shoulder supports can be adjusted independently of each other.

Figure 9:
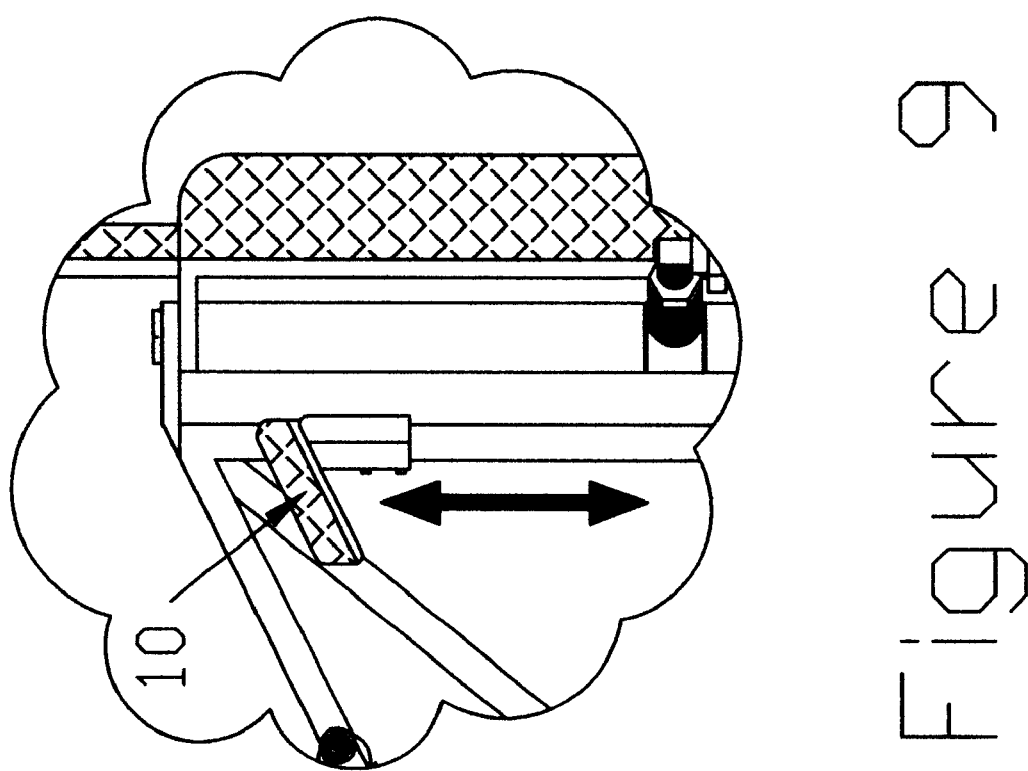

FIG. 9 is an enlarged view of the arm supports. The arrows depict the direction of adjustment of the arm supports.

Figure 10:
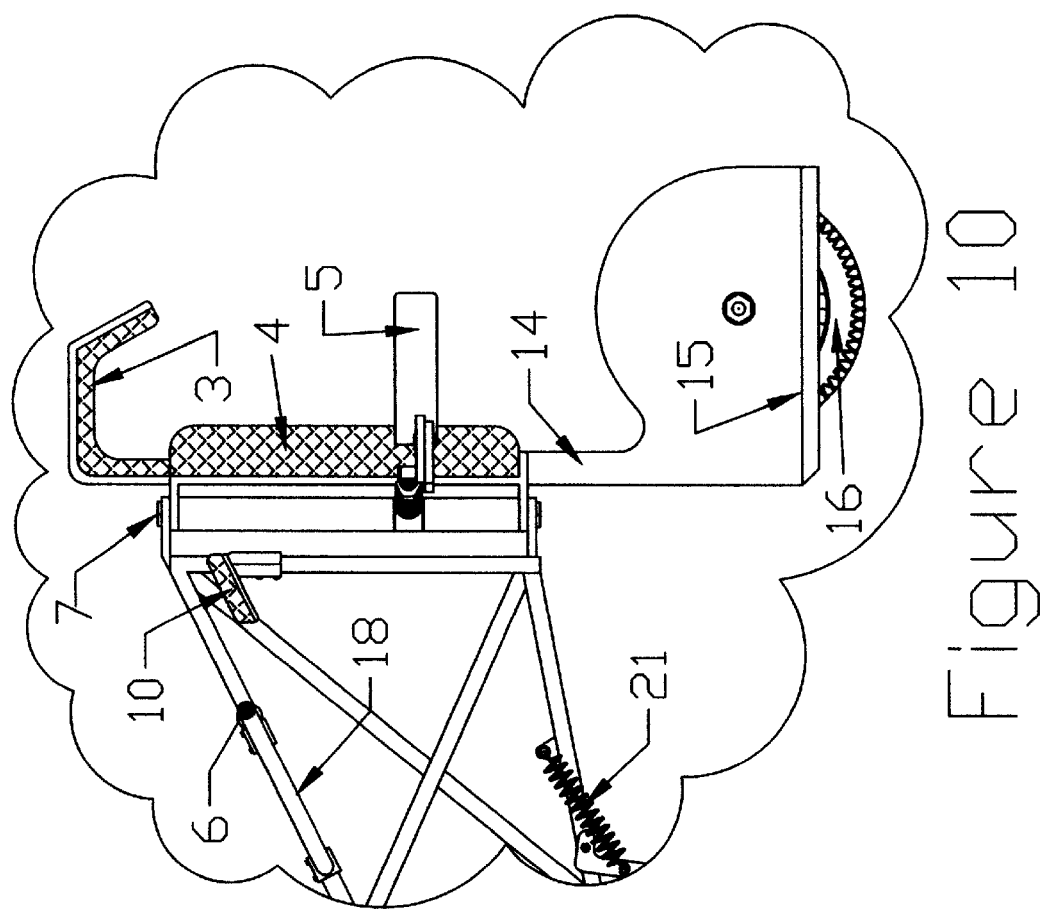

FIG. 10 is a side view of an example of the embodiment of the invention utilizing a singular trailing wheel mounted beneath a platform attached to the pivoting body pad.

Figure 11:
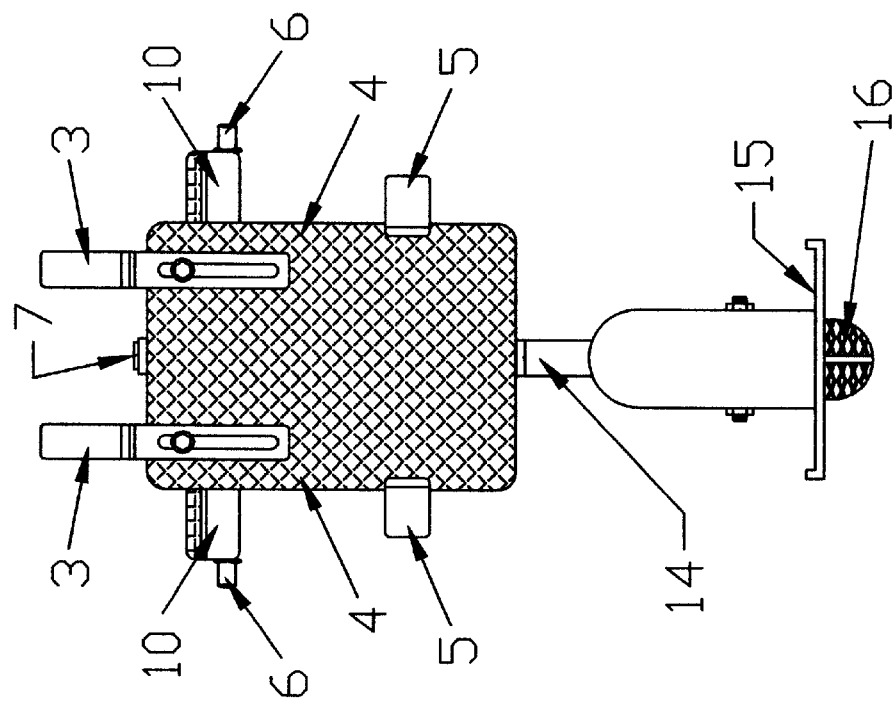

FIG. 11 is a view of an example of the embodiment of the invention utilizing a singular trailing wheel mounted beneath a platform attached to the pivoting body pad as seen from the rear of the vehicle.

Figure 12:
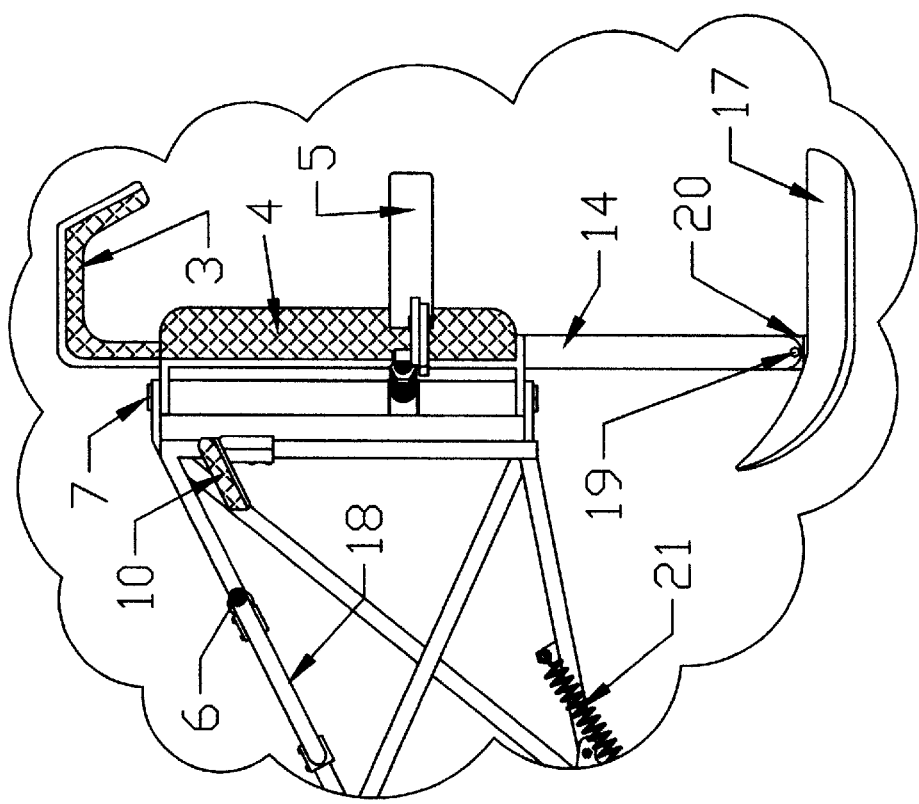

FIG. 12 is a side view of au example of the embodiment of the invention utilizing a singular ski attached to the pivoting body pad.

Figure 13:
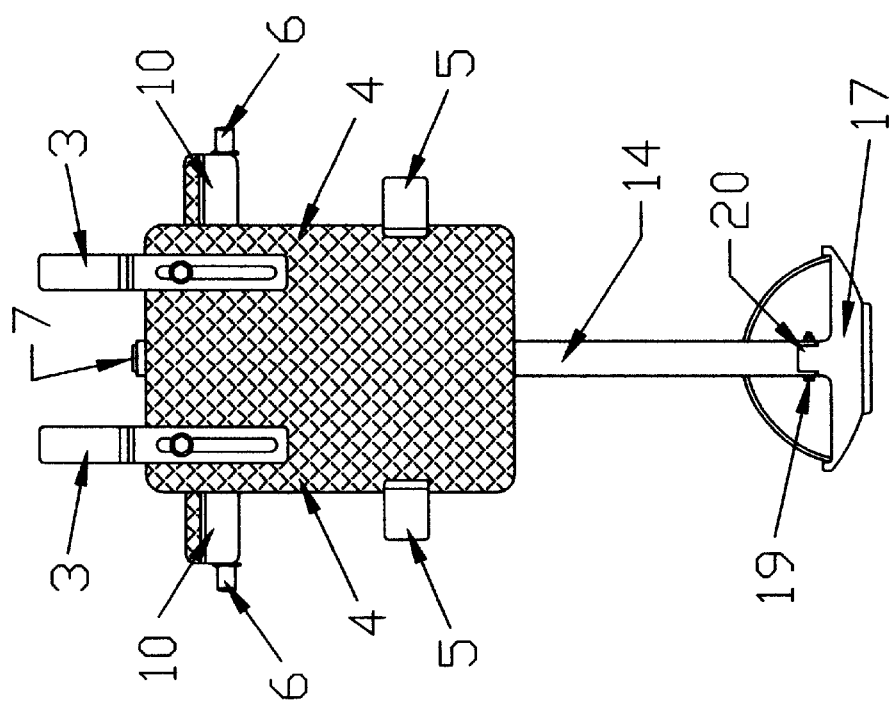

FIG. 13 is a view of an example of the embodiment of the invention utilizing a singular ski attached to the pivoting body pad as seen from the rear of the vehicle.

Figure 14:
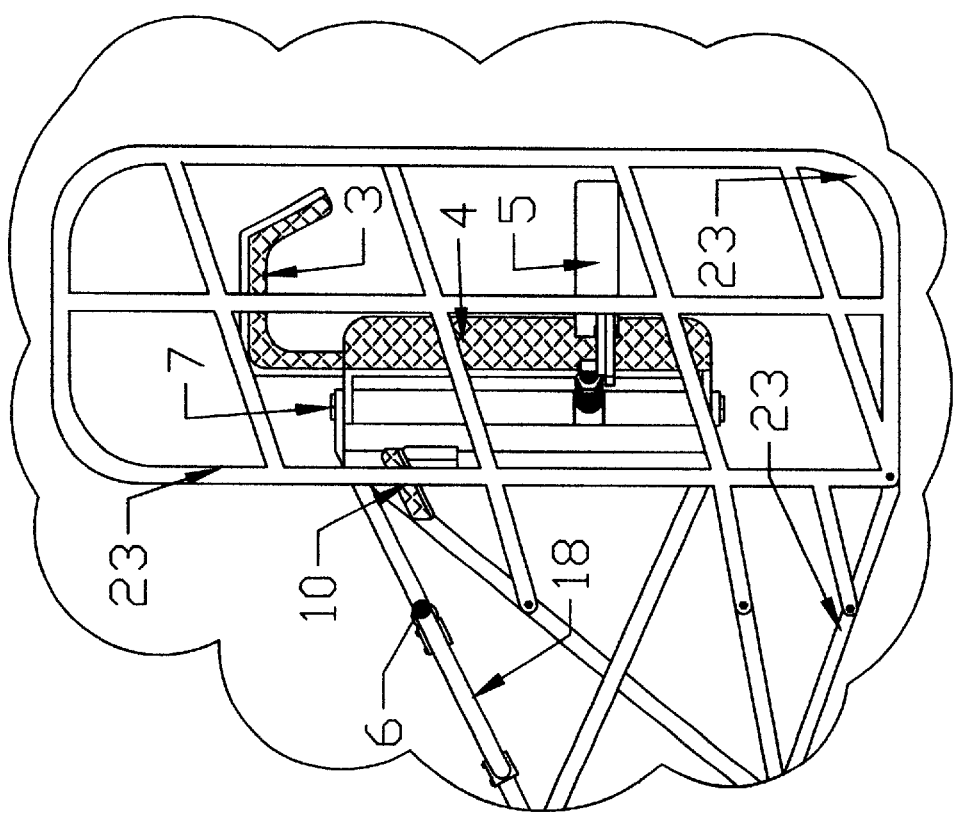

FIG. 14 is a side view of an example of the embodiment of the invention showing a crash guard surrounding the area that is occupied by the operator.

Figure 15:
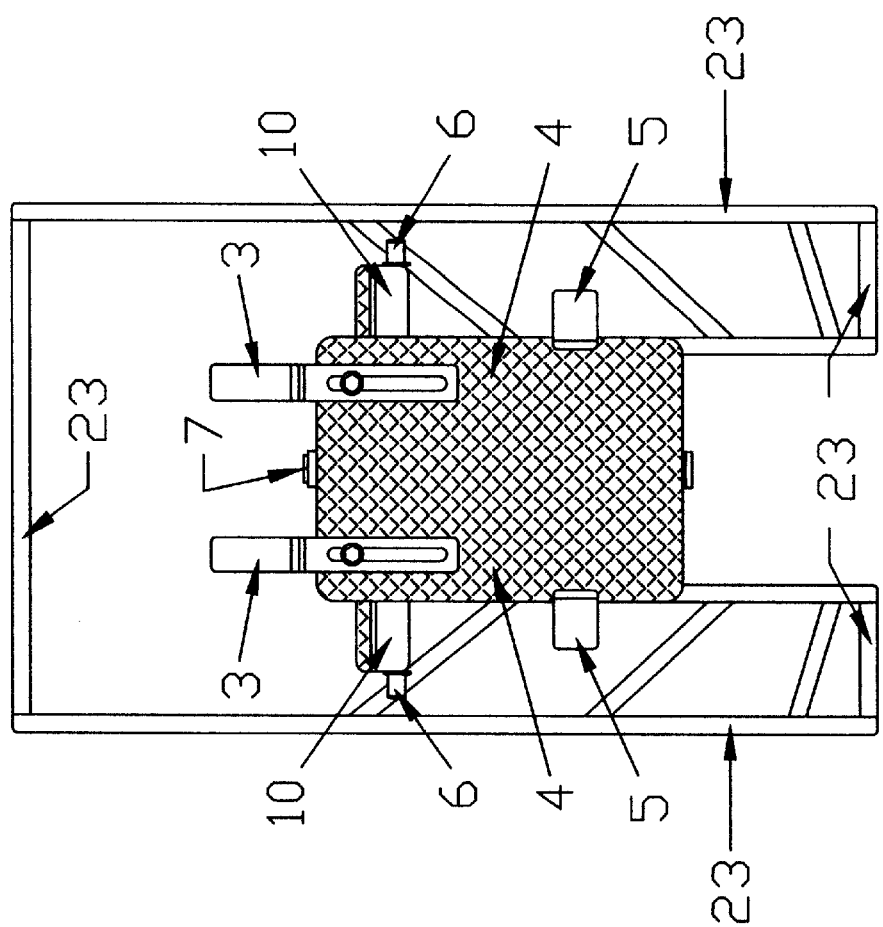

FIG. 15 is a view of an example of the embodiment of the invention showing a crash guard surrounding the area that is occupied by the operator as seen from the rear of the vehicle.

Figure 16:
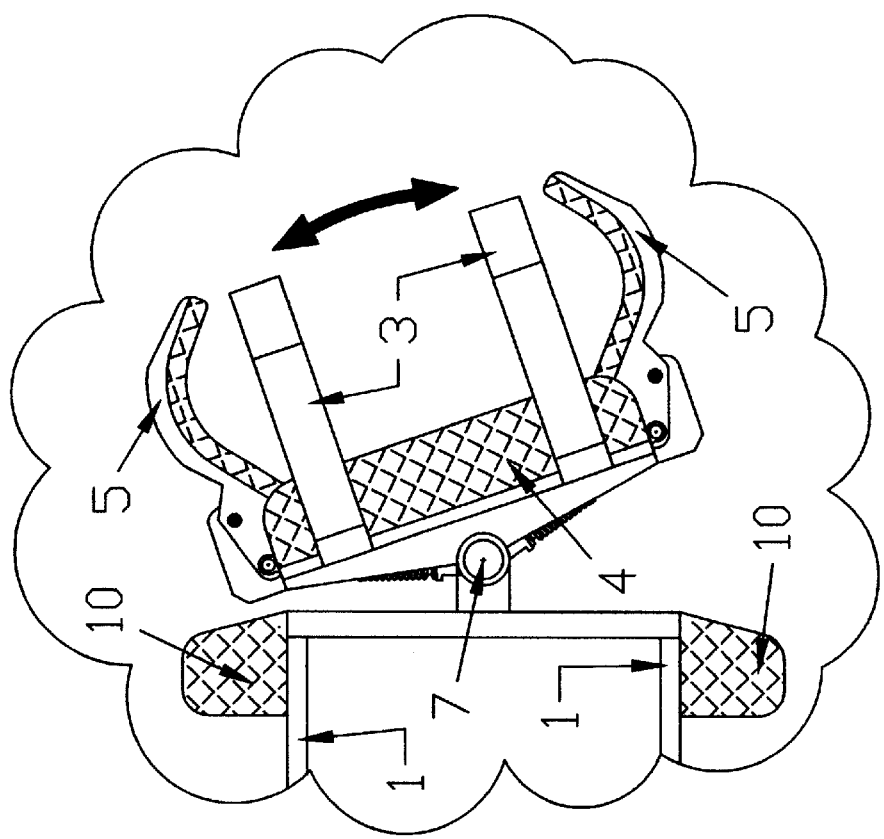

FIG. 16 is an enlarged top view of an example of the embodiment of the pivoting body pad and frame at the pivot area. The arrow depict the movement of the pivoting body pad in relation to the frame.

Figure 17:
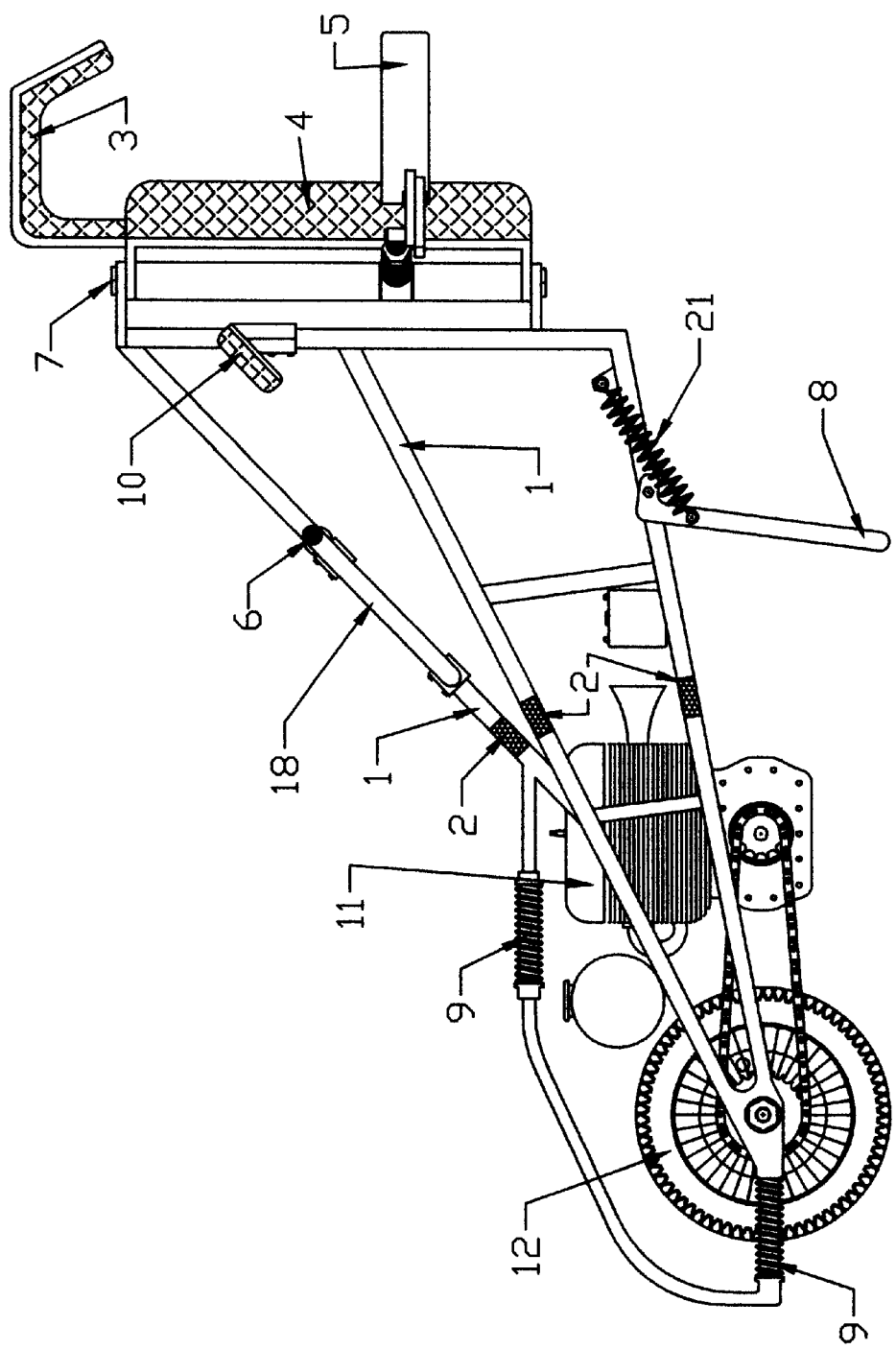

FIG. 17 is a side view of an example of the embodiment of the invention utilizing a singular drive wheel and showing the engine mounted behind of the drive wheel and low in the frame. The drawing depicts the invention configured to be more maneuverable with a shorter framework.

Figure 18:
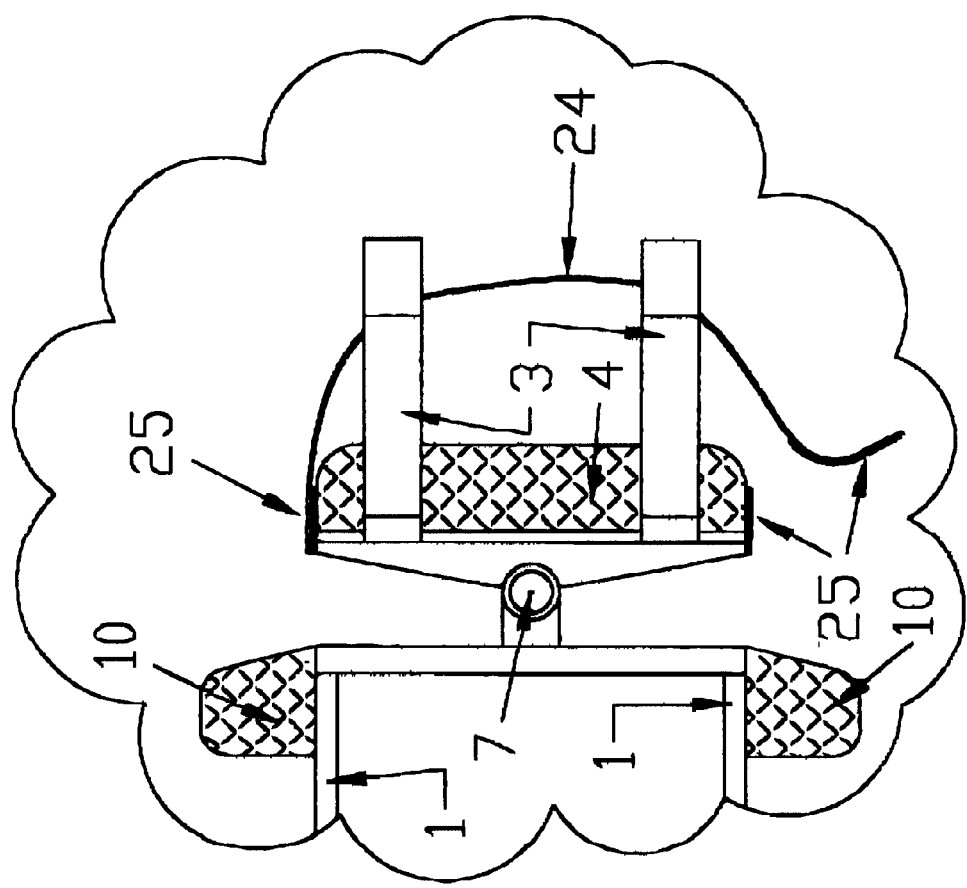

FIG. 18 is a top view of an example of the embodiment of the torso belt and quick release fastening system.

DETAILED DESCRIPTION OF THE INVENTION

Figure 4:
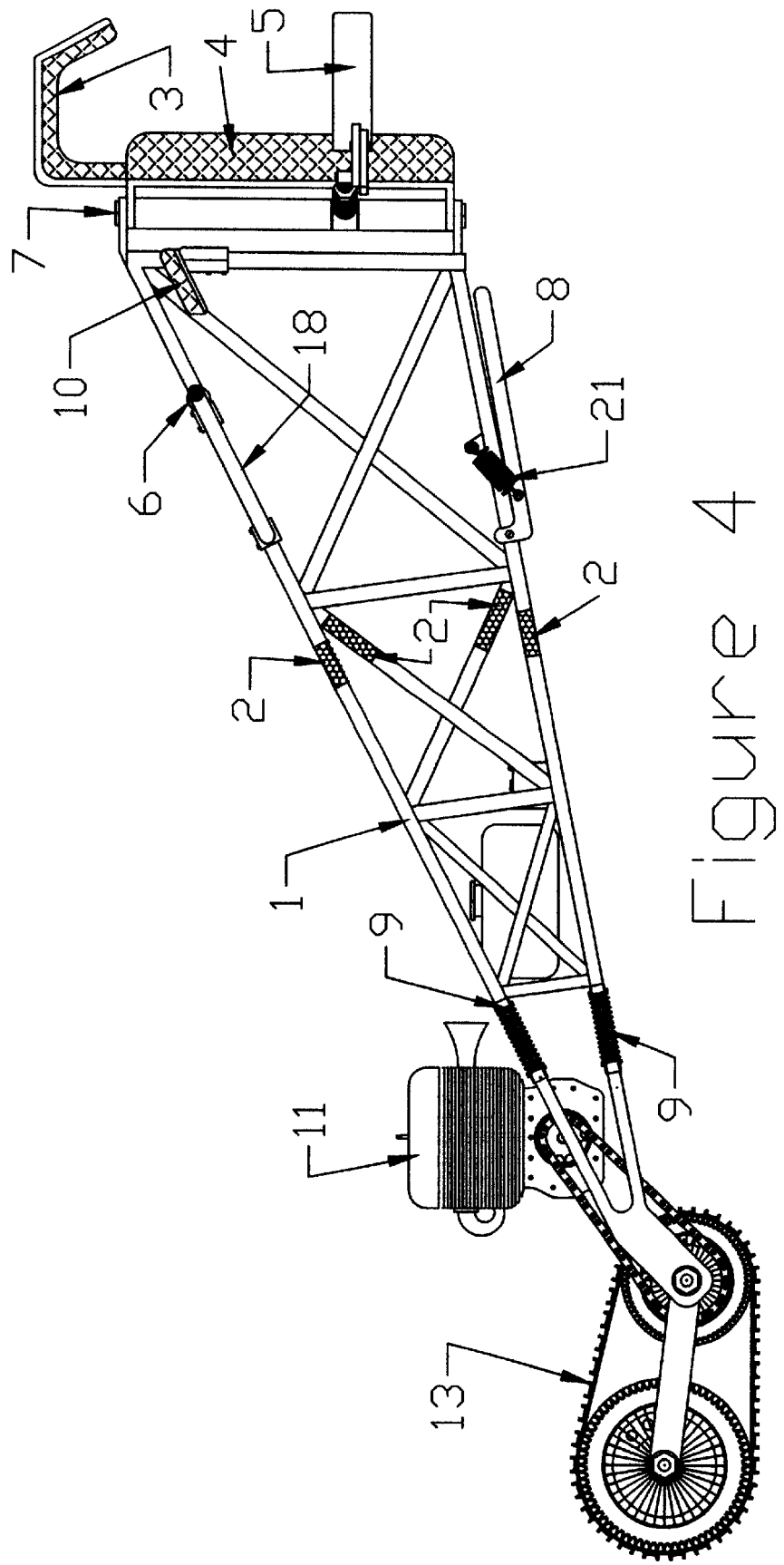
FIG. 4 is a side view of an example of the embodiment of the invention utilizing a singular driven track and showing the engine mounted behind the track.
Figure 5:
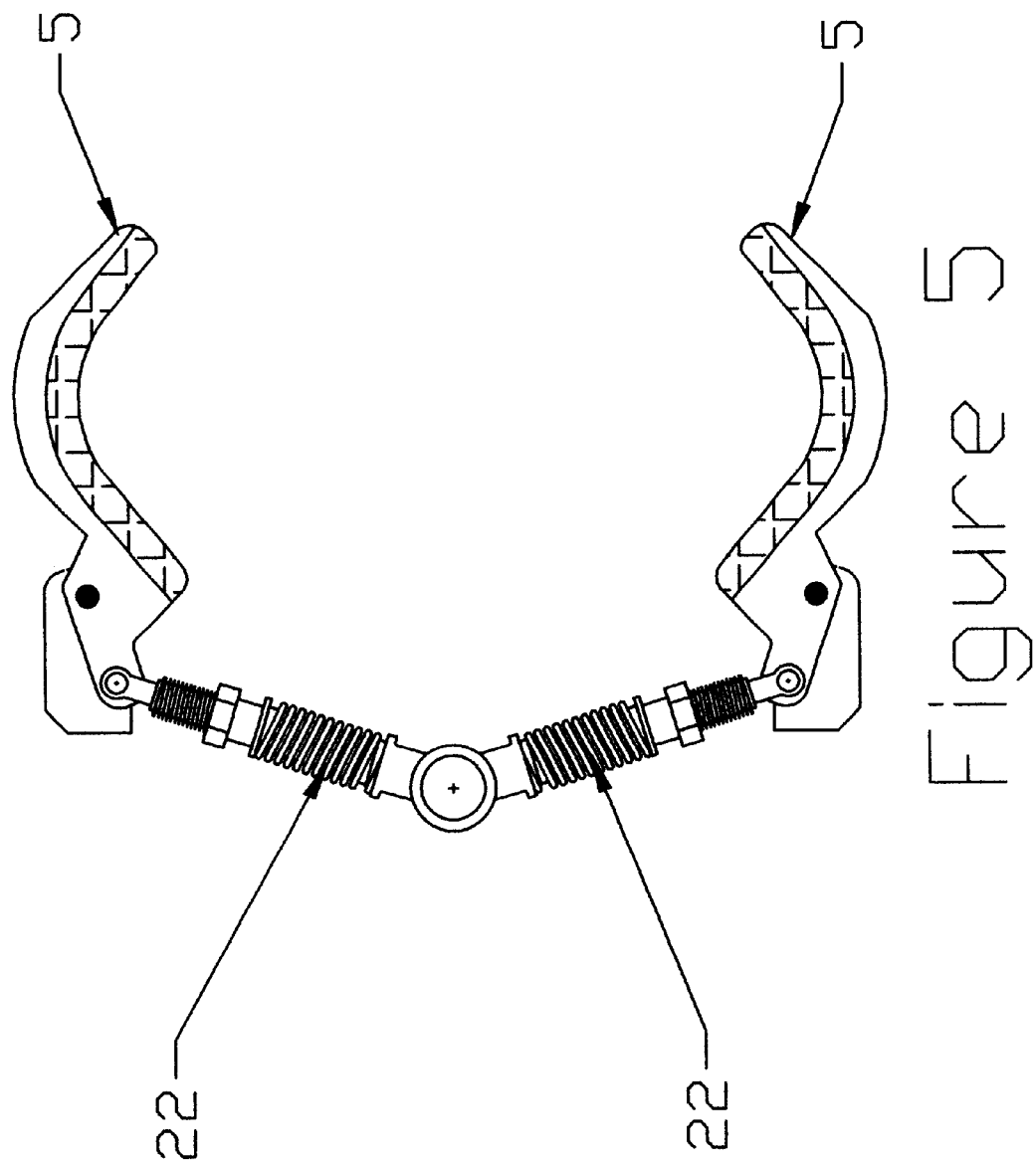
FIG. 5 is an enlarged top view of an example of the embodiment of the torso clamp shown in the open position.
Figure 6:
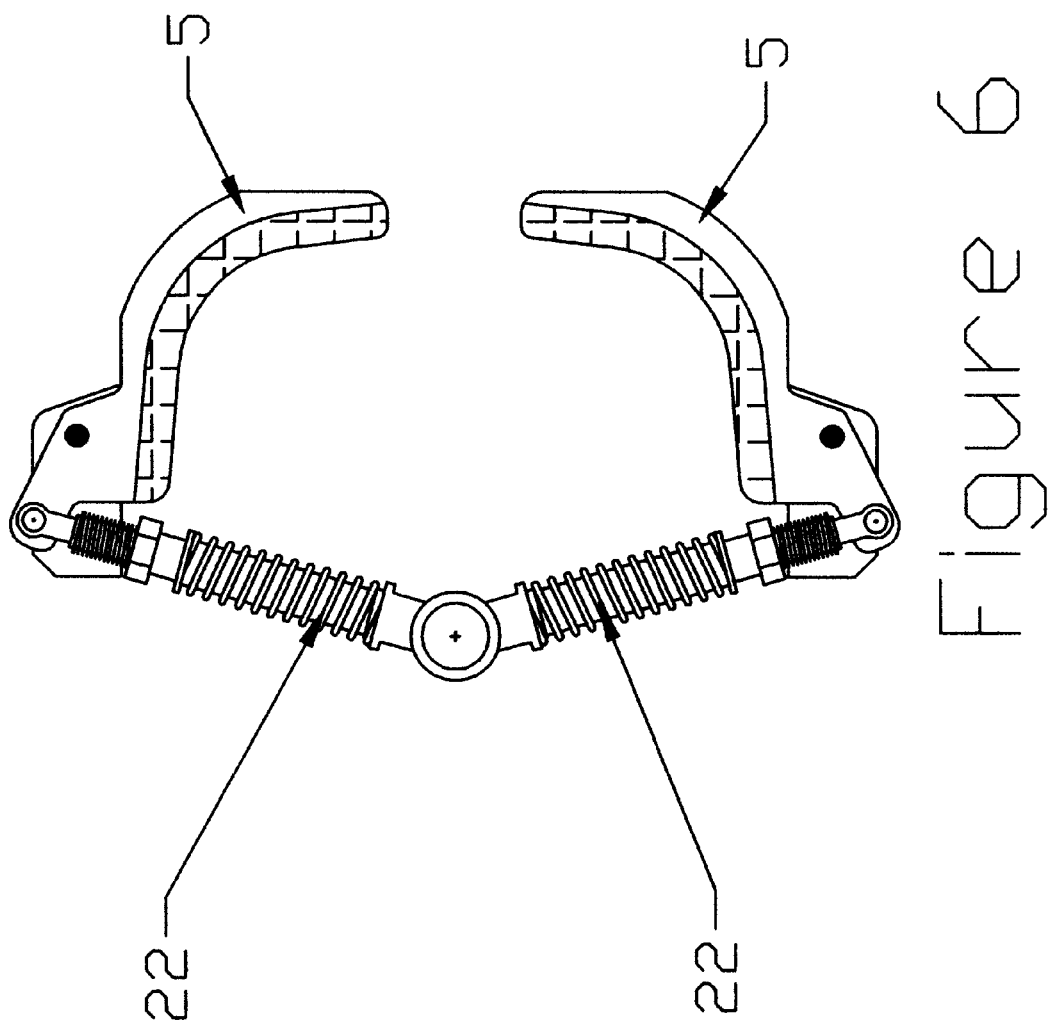
FIG. 6 is an enlarged top view of an example of the embodiment of the torso clamp shown in the closed position.

The embodiment described herein are examples and it would be possible to modify them, notably by the substitution of technical equivalents, without departing from the scope of the invention. The invention can be configured to accommodate any practical placement of the engine, such as ahead of or behind the drive wheel or rotating track. The framework that connects the motive power to the operator's controls can be manufactured of metal tubing in the form of a latticework molded from reinforced plastics or manufactured using any of the various technologies for constructing rigid structures. The motor, which drives the vehicle, can be of any practical type and while the drawings depict an internal combustion reciprocating piston type engine, other types of motors will also work According to the invention aid referring to FIGS. 1 through 4, the operator would approach the after portion of the vehicle, open the torso clamp 5, and lift the after portion of the vehicle, that which is resting on the folding stand 8, up off of the ground. The folding stand 8, is attached to the frame 1 and supports the vehicle when parked and not in use. The operator would raise the after part of the vehicle up to place the shoulder supports 3 on his/her shoulders. The shoulder supports 3 are padded for comfort and designed to adjust vertically, as shown more clearly in FIG. 8, to accommodate operators of different heights. The operator would now move his/her body in against the ergonomically contoured pivoting body pad 4, which is adjustable to suit the operator as shown in FIG. 8, and release the torso clamp 5 to the closed position. FIGS. 5 and 6 depict the torso clamp 5 in the open and closed position. The torso clamp 5 is padded for operator comfort. Referring to FIG. 5 and 6, the torso clamp 5 has adjustable springs 22 forcing it closed. The torso clamp 5 will release if a force stronger than the adjusted spring load of the springs 22 is applied, allowing the operator to become freed from the vehicle during a fall. The operator can also overcome the spring load setting of the torso clamp 5, by pushing back from the machine should the immediate disengagement from tie vehicle be required. During operation, the operator remains in close contact with the vehicle at all times and is held against the pivoting body pad 4 by the torso clamp 5. An alternative to the torso clamp 5, is a torso belt 24 as shown in FIG. 18. The torso belt 24 would attach to the pivoting body pad 4 with a quick release fastening system 25.

Figure 1:
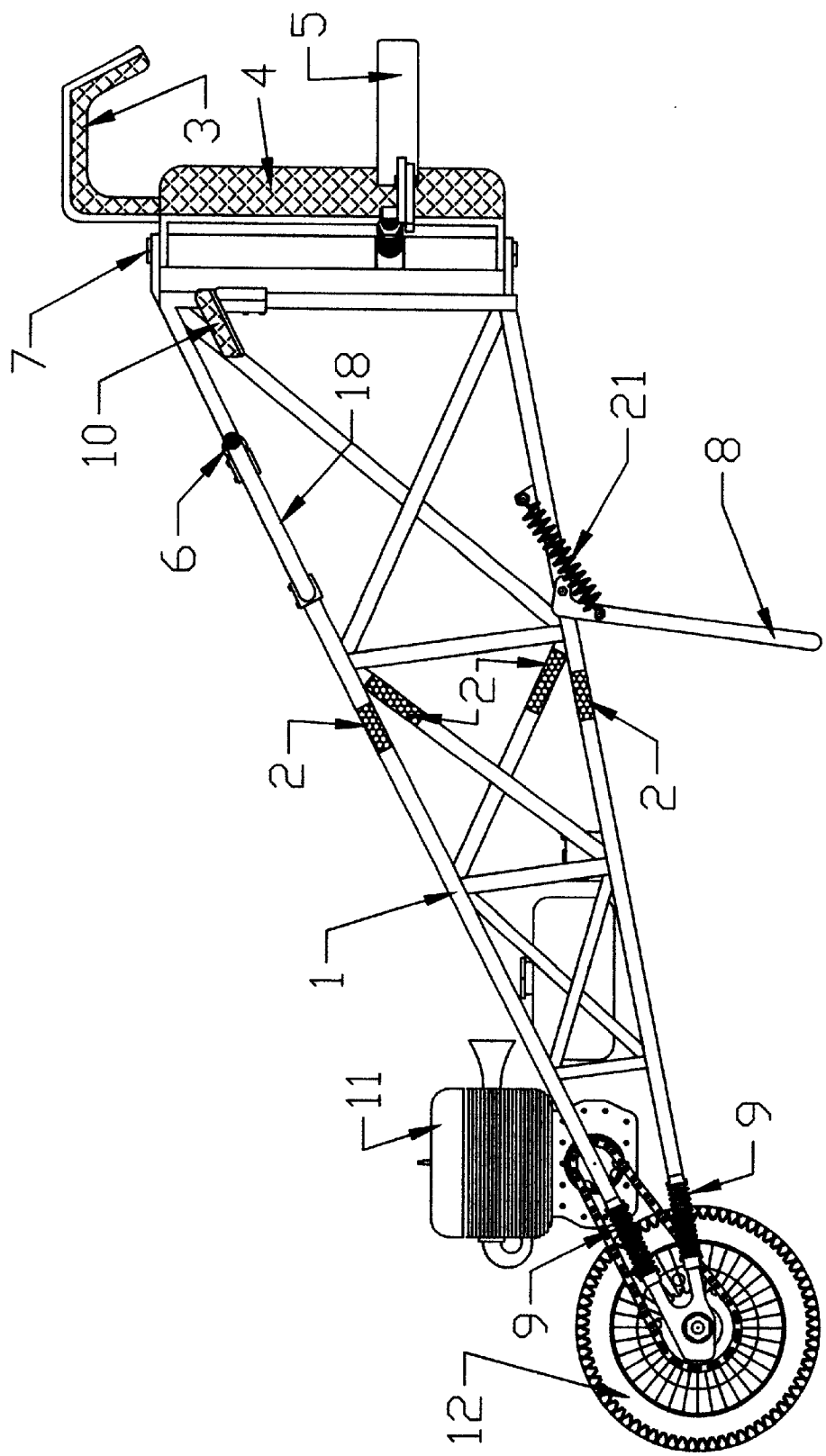
FIG. 1 is a side view of an example of the embodiment of the invention utilizing a singular drive wheel and showing the engine mounted behind the drive wheel.
Figure 2:
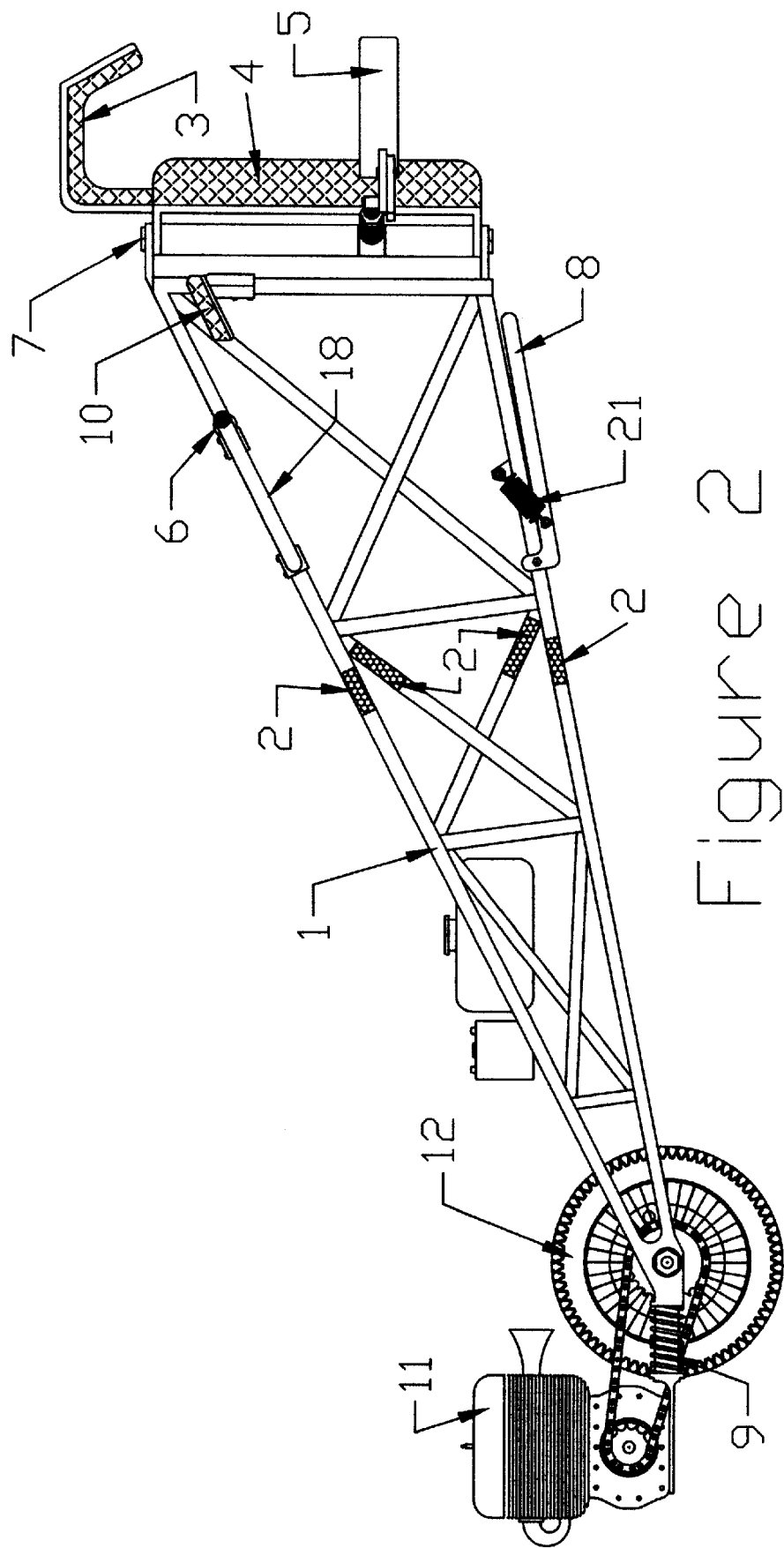
FIG. 2 is a side view of an example of the embodiment of the invention utilizing a singular drive wheel and showing the engine mounted ahead of the drive wheel.
Figure 3:
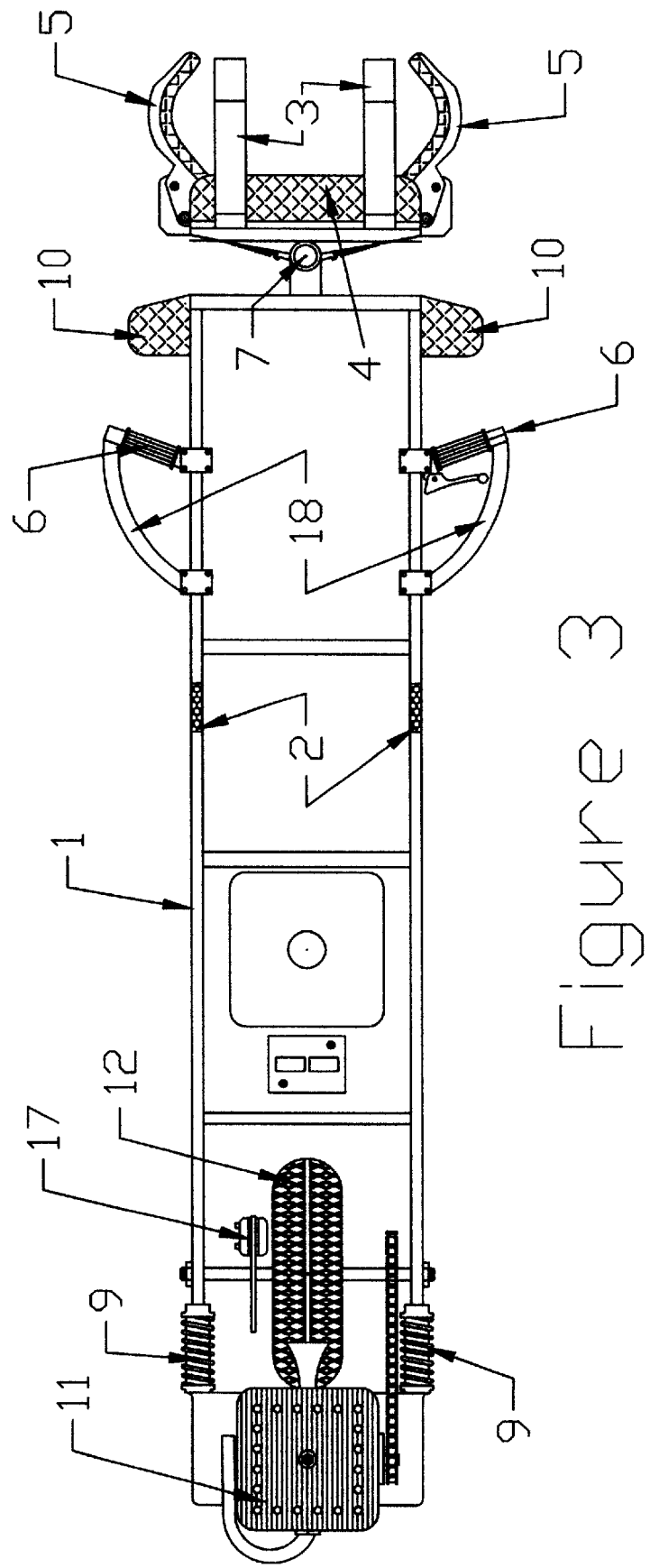
FIG. 3 is a top view of an example of the embodiment of the invention utilizing a singular drive wheel and showing the engine mounted ahead of the drive wheel.
Figure 7:
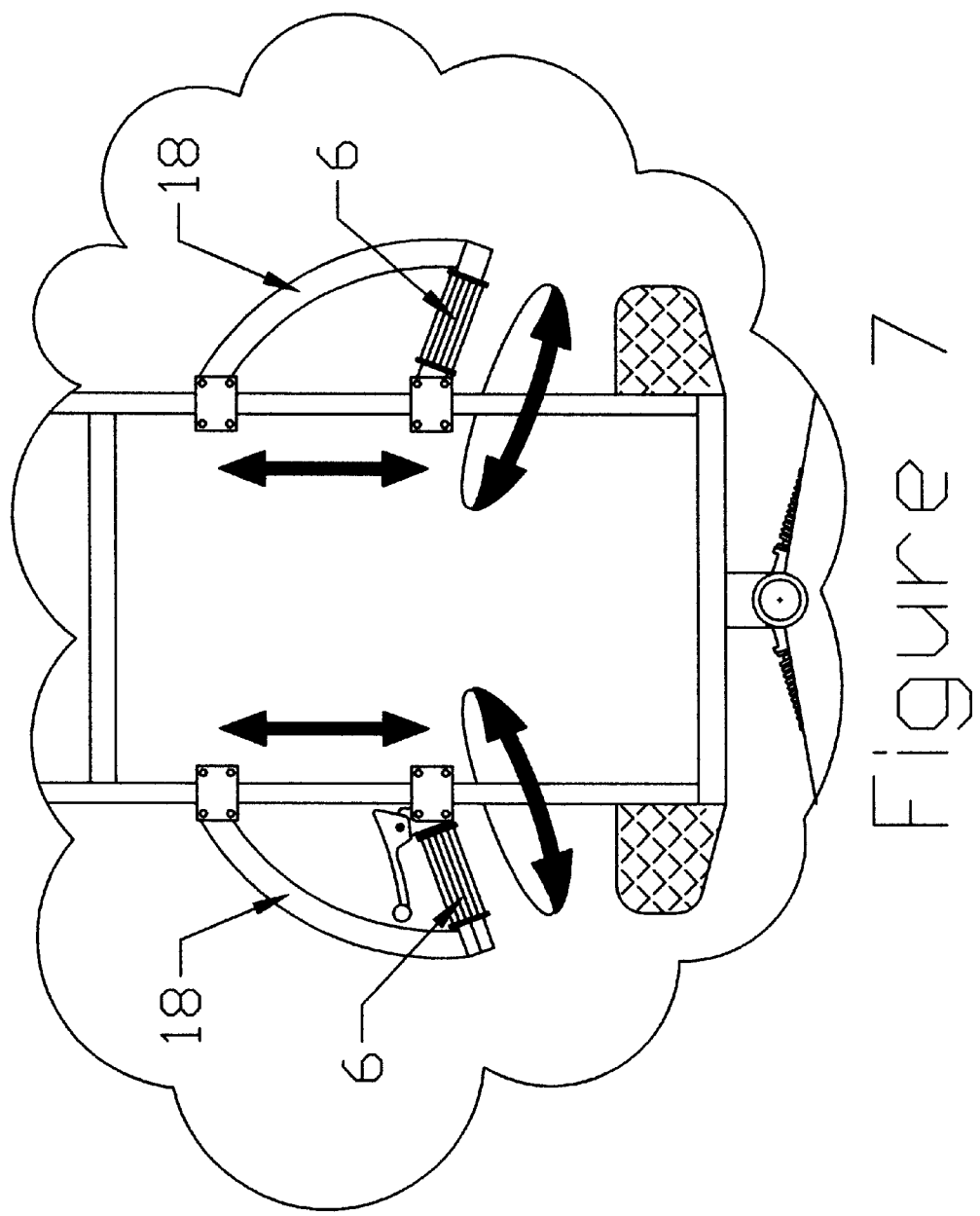
FIG. 7 is an enlarged view of an example of the embodiment of the handgrip and crash guard assembly. The arrows depict the direction of adjustment of the handgrip and crash guard assembly.

For further operator comfort, the weight of the operator's arms is supported by arm supports 10, the arm supports 10 are padded and their height can be adjusted to suit different operators, as shown in more detail by FIG. 9. The operator would then grip the handgrips 6. The handgrips 6 have a crash guard 18 extending across the outboard side of the handgrips to deflect objects and protect the operator's hands. The handgrips 6 are fully adjustable to suit the different arm lengths of the operator's arms and the angle that they form relative to the longitudinal axis of the frame is adjustable to suit the comfort of the operator's hands as shown in detail by FIG. 7. The operator would start the motor 11 by selecting a switch (not shown) placed near the handgrips 6. After starting the motor 11, the operator pulls the folding stand 8 slightly towards the rear of the vehicle where the spring assist 21 pulls the folding stand up against the frame 1. FIG. 1 shows the folding stand 8 in use while FIG. 2 shows the folding stand 8 retracted and up against the frame 1. At this point, the operator would actuate the accelerator mechanism (not shown) to start the vehicle's wheel 12 as in FIG. 1, or a continuous track 13 as shown in FIG. 4, in forward motion. Gradual direction changes are accomplished by pulling against one of the handgrips 6, which has the effect of causing the pivoting body pad 4 to pivot about its axis on a pin 7 effecting a change in the direction of travel. The movement of the pivoting body pad 4 about its axis is further illustrated in FIG. 16. More pronounced turns require a combination of pivoting the pivoting body pad 4 while shifting body weight and leaning in the desired direction of travel. Stopping is accomplished by applying the caliper type brake 17, shown in FIG. 3, after which the operator would open the torso clamp 5, lift the shoulder supports 3 off of the shoulders and return the machine to rest upon its folding stand 8. The frame 1 of the vehicle is designed to absorb energy, in the event of the vehicle striking an object, and incorporates energy absorbing springs 9 or energy absorbing crumple zones 2 in the framework to absorb impact.

It is possible that some people may not wish to wear skates or skis and may choose a modification of the machine that attaches skis or wheels to the lower portion of the pivoting body pad assembly. Referring to FIGS. 10 through 13 two examples of this modification are shown. FIGS. 10 and 11 depict the modification in which a trailing wheel 16 is mounted beneath a platform 15 for the operator to stand upon, the trailing wheel 16 is connected to the pivoting body pad 4 by the extension shaft 14. FIGS. 12 and 13 depict the modification in which a singular ski 17 is attached to the pivoting body pad 4 by the extension shaft 14, the operator would stand directly on the ski 17. The ski 17 is fitted with a hinge assembly 20 to allow the angle of the ski 17 to conform to the changing terrain. The hinge assembly 20 is fastened to the extension shaft 14 with a bolt 19. Operation of the vehicle would be similar to the previously mentioned version with the operator pivoting the body pad 4 in unison with the trailing wheel 16 or ski 17 to change direction. In this modification, the trailing wheel 16 or ski 17 supports any of the weight not supported by the drive wheel 12 or rotating track 13, and the shoulder supports 3 could be removed, at the operators discretion.

It may also be desirable to fit the vehicle with a crash guard 23, as shown in FIGS. 14 and 15, which encompasses the peripheral area of the operator. A crash guard 23 such as this would afford greater protection to the operator from falls and collision with objects.

I claim:

1. A vehicle for transporting people comprising of; a motor coupled to a drive wheel connected through a frame to a pivoting body pad fitted with a torso clamp, whereas, said drive wheel acts as a traction means transmitting the rotational motion from the motor to the ground and causing said vehicle to move forward, whereas, said frame acts as a connecting means joining said motor and said drive wheel to said pivoting body pad with a pin, said pin to act as a connecting means and a center point of the pivoting axis, whereas, said pivoting body pad is attached to the frame of said vehicle via said pin, said pin acting as a pivot axis to allow the operator to cause the pivoting body pad to pivot independently of said frame, said pivot means acting to improve the control and operation of the said vehicle, whereas, said pivoting body pad is ergonomically shaped for operator comfort and for the efficient communication of movement between the operator and said vehicle, said pivoting body pad being adjustable along a vertical axis as a means of accommodating operators of differing heights, said pivoting body pad being constructed of a compressible material which will absorb impact and cushion the operator from the stress of rapid deceleration, whereas, said pivoting body pad is fitted with shoulder supports acting as a means of distributing the weight of the vehicle, which is not supported by said drive wheel, to the operators shoulders, said shoulder supports are padded for comfort, said shoulder supports being adjustable along a vertical axis independent of said pivoting body pad as a means of accommodating operators of differing body heights, whereas, said shoulder supports also act as a means of transmitting a portion of forward motion from said vehicle to the operator's upper body, whereas, said shoulder supports also act as a means of maintaining the operator in close communication with said pivoting body pad, whereas, said frame is fitted with a folding stand for resting the weight of the vehicle when not in use, said folding stand to have a spring assist to maintain said folding stand against said frame when not in use, whereas, said frame is also fitted with crumple zones and compression springs as a means to absorb impact, whereas, said frame is fitted with arm supports to support the weight of the operators arms, said arm supports are padded for the comfort of the operator and adjustable along a vertical axis to accommodate operators of different heights, whereas, said drive wheel is a traction means fitted with a braking means, said braking means allowing the operator to slow said vehicle as well as bringing said vehicle to a controlled stop, whereas, said frame is fitted with handgrips, said handgrips affording a gripping surface for the operators hands, said handgrips to encompass throttle and brake actuators for accelerating and braking, said handgrips and said throttle and brake actuators are to be fitted with a crash guard extending outboard as a deflection means for objects that may come in contact with said vehicle, said handgrip crash guard to be formed as a part of said handgrips and said throttle and brake actuators and to act as a means of protection for the operators hands, said handgrips, said throttle and brake actuators, and said handgrip crash guards are adjustable fore and aft along the frame insomuch as they can slide along said frame to a suitable position and be locked in place to accommodate different arm lengths of operators, said handgrips, said throttle and brake actuators, and said handgrip crash guards are adjustable in relation to the angle that they form relative to the longitudinal axis of said frame insomuch as they can be rotated in relation to said frame to a suitable position and locked in place to accommodate the comfort of the operator, whereas, said torso clamp is attached to said pivoting body pad and is padded for comfort and closes around the operator's torso and acts as a means of transmitting the forward motion from said vehicle to the operator while also acting as a means of maintaining the operator in close communication with said pivoting body pad, said torso clamp is spring-loaded and said spring loads are fully adjustable, said torso clamp to release at a preset level to automatically free the operator from said pivoting body pad in the event of a stress placed on the torso clamp which is greater than that which it has been adjusted for, whereas, the operator will guide the vehicle with a combination of rotating said pivoting body pad, as a means of changing direction, and shifting his/her body weight and leaning into the direction of the desired travel.

2. A vehicle for transporting people as in claim 1 whereas said motor is coupled to a rotating track, said rotating track acting as the traction means transmitting the rotational motion from said motor to the ground and causing said vehicle to move forward.

3. A vehicle for transporting people as in claim 2 whereas said pivoting body pad is solidly attached to at least one ski with an extension shaft as a connecting means, said ski to form a platform for the operator to stand upon, said ski and said pivoting body pad acting to pivot in unison, whereas, said ski is to be fitted with a hinge assembly to allow said ski to conform to the changing angle of the terrain as said vehicle travels, whereas, the operator will guide said vehicle with a combination of rotating said pivoting body pad and said ski attached thereto, in conjunction with the operator purposely shifting his/her weight and leaning into the direction of the desired travel.

4. A vehicle for transporting people as in claim 1 whereas said pivoting body pad is solidly attached to at least one trailing wheel with an extension shaft as a connecting means, said trailing wheel to form the basis of a platform for the operator to stand upon, said trailing wheel and said pivoting body pad acting to pivot in unison, whereas, the operator will guide said vehicle with a combination of rotating said pivoting body pad and said trailing wheel attached thereto, in conjunction with the operator purposely shifting his/her weight in the direction of the desired travel.

5. A vehicle for transporting people as in claim 1, whereas a crash guard system is installed in the periphery of the operators area, said crash guard system to be formed from tubing and fastened to said vehicle to extend around the operator, said crash guard system to act as a means of protection for the operator.

6. A vehicle for transporting people comprising of; a motor coupled to a drive wheel connected through a frame to a pivoting body pad fitted with a torso belt, whereas, said drive wheel acts as a traction means transmitting the rotational motion from the motor to the ground and causing said vehicle to move forward, whereas, said frame acts as a connecting means joining said motor and said drive wheel to said pivoting body pad with a pin, said pin to act as a connecting means and a center point of the pivoting axis, whereas, said pivoting body pad is attached to the frame of said vehicle via said pin, said pin acting as a pivot axis to allow the operator to causes the pivoting body pad to pivot independently of said frame, said pivot means acting to improve the control and operation of the said vehicle, whereas, said pivoting body pad is ergonomically shaped for operator comfort and for the efficient communication of movement between the operator and said vehicle, said pivoting body pad being adjustable along a vertical axis as a means of accommodating operators of differing heights, said pivoting body pad being constructed of a compressible material which will absorb impact and cushion the operator from the stress of rapid deceleration, whereas, said pivoting body pad is fitted with shoulder supports acting as a means of distributing the weight of the vehicle, which is not supported by said drive wheel, to the operators shoulders, said shoulder supports are padded for comfort, said shoulder supports being adjustable along a vertical axis independent of said pivoting body pad as a means of accommodating operators of differing body heights, whereas, said shoulder supports also act as a means of transmitting a portion of forward motion from said vehicle to the operator's upper body, whereas, said shoulder supports also act as a means of maintaining the operator in close communication with said pivoting body pad, whereas, said frame is fitted with a folding stand for resting tie weight of the vehicle when not in use, said folding stand to have a spring assist to maintain said folding stand against said frame when not in use, whereas, said frame is also fitted with crumple zones and compression springs as a means to absorb impact, whereas, said frame is fitted with arm supports to support the weight of the operators arms, said arm supports are padded for the comfort of the operator and adjustable along a vertical axis to accommodate operators of different heights, whereas, said drive wheel is a traction means fitted with a braking means, said braking means allowing the operator to slow said vehicle as well as bringing said vehicle to a controlled stop, whereas, said frame is fitted with handgrips, said handgrips affording a gripping surface for the operators hands, said handgrips to encompass throttle and brake actuators for accelerating and braking, said handgrips and said throttle and brake actuators are to be fitted with a crash guard extending outboard as a deflection means for objects that may come in contact with said vehicle, said handgrip crash guard to be formed as a part of said handgrips and said throttle and brake actuators and to act as a means of protection for the operators hands, said handgrips, said throttle and brake actuators, and said handgrip crash guards are adjustable fore and aft along the frame insomuch as they can slide along said frame to a suitable position and be locked in place to accommodate different arm lengths of operators, said handgrips, said throttle and brake actuators, and said handgrip crash guards are adjustable in relation to the angle that they form relative to the longitudinal axis of said frame insomuch as they can be rotated in relation to said frame to a suitable position and locked in place to accommodate the comfort of the operator, whereas, said torso belt is attached to said pivoting body pad and closes around the operator's torso and acts as a means of transmitting the forward motion from said vehicle to the operator while also acting as a means of maintaining the operator in close communication with said pivoting body pad, said torso belt is fastened to said pivoting body pad with a quick release fastening system, whereas, the operator will guide the vehicle with a combination of rotating said pivoting body pad, as a means of changing direction, and shifting his/her body weight and leaning into the direction of the desired travel.

7. A vehicle for transporting people as in claim 6 whereas said motor is coupled to a rotating track, said rotating track acting as the traction means transmitting the rotational motion from said motor to the ground and causing said vehicle to move forward.

8. A vehicle for transporting people as in claim 6 whereas said pivoting body pad is solidly attached to at least one ski with an extension shaft as a connecting means, said ski to form a platform for the operator to stand upon, said ski and said pivoting body pad acting to pivot in unison, whereas, said ski is to be fitted with a hinge assembly to allow said ski to conform to the changing angle of the terrain as said vehicle travels, whereas, the operator will guide said vehicle with a combination of rotating said pivoting body pad and said ski attached thereto, in conjunction with the operator purposely shifting his/her weight and leaning into the direction of the desired travel.

9. A vehicle for transporting people as in claim 6 whereas said pivoting body pad is solidly attached to at least one trailing wheel with an extension shaft as a connecting means, said trailing wheel to form the basis of a platform for the operator to stand upon, said trailing wheel and said pivoting body pad acting to pivot in unison, whereas, the operator will guide said vehicle with a combination of rotating said pivoting body pad and said trailing wheel attached thereto, in conjunction with the operator purposely shifting his/her weight in the direction of the desired travel.

10. A vehicle for transporting people as in claim 6, whereas a crash guard system is installed in the periphery of the operators area, said crash guard system to be formed from tubing and fastened to said vehicle to extend around the operator, said crash guard system to act as a means of protection for the operator.

* * * * *